United States Patent [19]

Baumann et al.

[11] Patent Number: 5,552,459
[45] Date of Patent: Sep. 3, 1996

[54] HIGHLY FILLED EPOXY CASTING RESIN COMPOSITIONS

[75] Inventors: Dieter Baumann, Möhlin, Switzerland; Werner Hollstein, Freiburg; Claus W. Rabener, Oetlingen, both of Germany; Peter Rüger, Oberwil, Switzerland

[73] Assignee: Ciba-Geigy Corporation, Tarrytown, N.Y.

[21] Appl. No.: 240,791

[22] Filed: May 10, 1994

Related U.S. Application Data

[63] Continuation of Ser. No. 158,842, Nov. 29, 1993, abandoned, which is a continuation of Ser. No. 979,957, Nov. 23, 1992, abandoned.

[30] Foreign Application Priority Data

Nov. 27, 1991 [CH] Switzerland ............... 3470/91

[51] Int. Cl.⁶ ............... C08K 3/22; C08L 63/00; C08L 63/02
[52] U.S. Cl. ............... 523/427; 523/440; 523/457; 523/428
[58] Field of Search ............... 523/440, 457, 523/427, 428

[56] References Cited

U.S. PATENT DOCUMENTS

| | | | |
|---|---|---|---|
| 3,206,330 | 9/1965 | Chottiner | 523/457 |
| 3,563,939 | 2/1971 | Stevens, Jr. et al. | 260/37 |
| 3,647,742 | 3/1972 | Stevens | 523/440 |
| 3,677,999 | 7/1972 | Denk | 523/457 |
| 3,699,070 | 10/1972 | Wynstra et al. | 260/31.4 |
| 3,996,186 | 12/1976 | Schreiber et al. | 260/37 |
| 4,117,361 | 9/1978 | Smith | 523/457 |
| 4,206,066 | 6/1980 | Rinehart | 523/427 |
| 4,356,157 | 10/1982 | Altman | 423/419 |
| 4,401,776 | 8/1983 | Munk | 523/443 |
| 4,458,029 | 7/1984 | Munk | 502/171 |
| 4,458,051 | 7/1984 | Munk | 524/779 |
| 4,490,492 | 12/1984 | Skudelny et al. | 523/443 |
| 4,668,718 | 5/1987 | Schreiber | 523/457 |
| 4,681,904 | 7/1987 | Yasuda | 523/457 |
| 4,855,340 | 8/1989 | Dawgayach | 523/457 |
| 5,096,762 | 3/1992 | Yoshida | 523/440 |

FOREIGN PATENT DOCUMENTS

| | | |
|---|---|---|
| 0038292 | 10/1981 | European Pat. Off. . |
| 0191872 | 8/1986 | European Pat. Off. . |
| 0385949 | 9/1990 | European Pat. Off. . |
| 1476082 | 4/1967 | France . |
| 2052085 | 4/1971 | France . |
| 2035620 | 11/1969 | Germany . |
| 2361624 | 12/1972 | Germany . |
| 3733789 | 4/1989 | Germany . |
| 084510 | 5/1982 | Japan ............... 523/457 |
| 428197 | 7/1967 | Switzerland . |
| 1337952 | 11/1973 | United Kingdom . |

OTHER PUBLICATIONS

Abstract for FR. 2052085.
Chemical Abstr. 91452W, vol. 67, 1967.
Ullmann's Encyclopedia of Industrial Chemistry 5th Edition, vol. A11 pp. 126–128.
Chem. Abstr. 111:196067e.

Primary Examiner—D. R. Wilson
Attorney, Agent, or Firm—William A. Teoli, Jr.; David R. Crichton

[57] ABSTRACT

The invention relates to flame-retarded compositions comprising

A) an epoxy resin mixture consisting of
  A1) 15–35% by weight of at least one liquid epoxy resin,
  A2) 55–85% by weight of aluminum oxide trihydrate having a particle size of $D_{50}$ 20–25 μm as determined by sieving,
  A3) 0–20% by weight of at least one further filler and
  A4) 0–5% by weight of at least one conventional additive
and B) at least one carboxylic acid anhydride
or
a cycloaliphatic diamine of the formula I or II

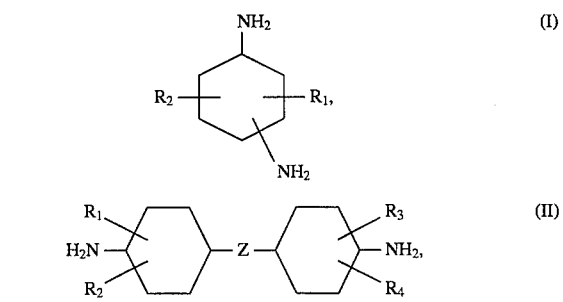

in which the radicals $R_1$ to $R_4$ independently of one another are hydrogen or $C_1$–$C_4$alkyl and Z is a direct bond, —$CH_2$—, —$C(CH_3)_2$—, —S—, —O—, —$SO_2$— or —CO—, in an amount sufficient to cure component A, the content of components A2 and A3 together being 63–80% by weight, with respect to the total weight of the composition. These compositions are suitable for use in high voltage components, such as flyback transformers.

11 Claims, No Drawings

HIGHLY FILLED EPOXY CASTING RESIN COMPOSITIONS

This application is a continuation, of application Ser. No. 08/158,842, filed Nov. 29, 1993, now abandoned which is a continuation of Ser. No. 07/979,957 filed Nov. 23, 1992, now abandoned.

The invention relates to highly filled epoxy casting resin compositions which in the cured state have excellent flame retardancy, to a process for the preparation of cured products using these compositions and to the use of these compositions as encapsulating material for electrical and electronic components, especially for flyback transformers.

When using epoxy resins as casting resin compositions, for example for high voltage components such as flyback transformers for televisions or car ignition coils, it is necessary that these compositions have very good flame retardancy and resistance to moisture. In addition, there should be no restrictions with regard to the impregnatability of these compositions.

A conventional test method for estimating the flame resistance of a material is method UL 94 from the Underwriters Laboratory (in this context cf. Ullmann's Encyclopedia of Industrial Chemistry, 5th Ed., Vol. A 11, pages 126 et seq.). Thus, the classification UL 94 V-0 (1.6 mm) of a material signifies that test pieces having dimensions of 127 mm×12.7 mm×1.6 mm, which are mounted vertically and have been ignited at the lower end with the aid of a Bunsen burner, must be extinguished after less than 10 seconds.

Conventional epoxy casting resin compositions, which are distinguished by a classification UL 94 V-0 (1.6 mm) with regard to the flame resistance and are suitable, for example, for the encapsulation of flyback transformers, are generally based on halogen-, antimony trioxide- and/or phosphorus-containing formulations. These are increasingly being graded as toxicologically unacceptable since either they contain substances such as antimony trioxide or, during processing, phosphines can form from phosphorus-containing additives or, on incineration, dibenzofurans or dioxins can be liberated from halogen-containing additives. Alternative formulations which comprise fillers which are graded as toxicologically acceptable are therefore being sought.

U.S. Pat. No. 3,677,999 describes curable casting resin moulding compositions, for the production of non-combustible electrical components, based on aluminium oxide-containing epoxy, polyester, phenolic, polyurethane or silicone resin moulding compositions, which, however, have a relatively low filler content.

DE 37 33 789 describes reactive resin compositions for the preparation of halogen-free reactive resin moulding materials of low flammability. The curing agent used is isophoronediamine.

It has now been found, surprisingly, that specific highly filled epoxy resin compositions based on aluminium oxide trihydrate meet the flame retardancy classification UL 94 V-0 (1.6 mm) without the addition of toxicologically unacceptable additives and have no substantial restrictions with regard to impregnatability and resistance to moisture.

The present invention thus provides flame-retarded compositions comprising

A) an epoxy resin mixture consisting of
  A1) 15–35% by weight of at least one liquid epoxy resin,
  A2) 55–85% by weight of aluminium oxide trihydrate,
  A3) 0–20% by weight of at least one further filler and
  A4) 0–5% by weight of at least one conventional additive and
B) at least one carboxylic acid anhydride
or
a cycloaliphatic diamine of the formula I or II

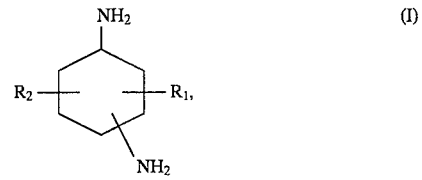

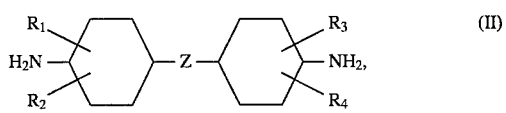

in which the radicals $R_1$ to $R_4$ independently of one another are hydrogen or $C_1$–$C_4$alkyl and Z is a direct bond, —$CH_2$—, —$C(CH_3)_2$—, —S—, —O—, —$SO_2$— or —CO—, in an amount sufficient to cure component A, the content of components A2 and A3 together being 63–80% by weight, with respect to the total weight of the composition.

A substituent in the above definition which is $C_1$–$C_4$alkyl can be straight-chain or branched. For example, it is methyl, ethyl, n-propyl, isopropyl, n-butyl, sec-butyl, isobutyl or tert-butyl.

Compositions comprising a carboxylic acid anhydride as component B in an amount sufficient to cure component A are preferred.

Compositions in which the content of components A2 and A3 together is 63–70% by weight, with respect to the total weight of the composition, are particularly preferred.

Compositions comprising, as component A, an epoxy resin mixture consisting of

A1) 18–30% by weight of at least one liquid epoxy resin,
A2) 60–80% by weight of aluminium oxide trihydrate,
A3) 0–15% by weight of at least one further filler and
A4) 0–3% by weight of at least one conventional additive
  are also preferred.

The liquid epoxy resins which are used in the compositions according to the invention are compounds which, on average, have more than one 1,2-epoxy group in the molecule.

Resins of this type can have an aliphatic, aromatic, cycloaliphatic, araliphatic or heterocyclic structure; they comprise epoxy groups as side groups, or these groups form part of an alicyclic or heterocyclic ring system. The epoxy groups are preferably bonded as glycidyl groups via ether or ester bonds with the remainder of the molecule, or the compounds are N-glycidyl derivatives of heterocyclic amines, amides or imides. Epoxy resins of these types are generally known and available commercially.

Preferred epoxy resins comprise at least two radicals of the formula III

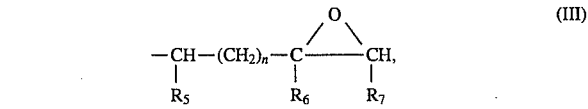

these radicals being bonded directly to oxygen, nitrogen or sulfur atoms, in which $R_5$ and $R_7$ are both hydrogen, $R_6$ is hydrogen or methyl and n=0, or in which $R_5$ and $R_7$ together are —$CH_2$—$CH_2$— or —$CH_2CH_2$—$CH_2$—, $R_6$ is then hydrogen and n = 0 or 1.

The following may be mentioned as examples of epoxy resins of this type:

I) Polyglycidyl and poly(β-methylglycidyl) esters obtainable by reaction of a compound having at least two carboxyl groups in the molecule and epichlorohydrin or glycerol dichlorohydrin or β-methyl-epichlorohydrin. The reaction is expediently carried out in the presence of bases.

The compounds having at least two carboxyl groups in the molecule which are used can be aliphatic polycarboxylic acids. Examples of these polycarboxylic acids are glutaric acid, adipic acid, pimelic acid, suberic acid, azelaic acid, sebacic acid or dimerised or trimerised linoleic acid.

However, cycloaliphatic polycarboxylic acids can also be used, for example tetrahydrophthalic acid, 4-methyltetrahydrophthalic acid, hexahydrophthalic acid or 4-methylhexahydrophthalic acid.

Aromatic polycarboxylic acids can also be used, for example phthalic acid, isophthalic acid, trimellitic acid or pyromellitic acid.

Carboxyl-terminated adducts, for example of trimellitic acid and polyols, for example glycerol or 2,2-bis(4-hydroxycyclohexyl)propane, can likewise also be used.

II) Polyglycidyl or poly(β-methylglycidyl) ethers obtainable by reaction of a compound having at least two free alcoholic hydroxyl groups and/or phenolic hydroxyl groups and a suitably substituted epichlorohydrin under alkaline conditions, or in the presence of an acid catalyst with subsequent treatment with alkali.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol or sorbitol, and also from polyepichlorohydrins.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they have aromatic rings, such as N,N-bis(2-hydroxyethyl)aniline or p,p'-bis(2-hydroxyethylamino)diphenylmethane.

The epoxy compounds can also be derived from mononuclear phenols, for example resorcinol or hydroquinone, or they are based on polynuclear phenols, for example on bis(4-hydroxyphenyl)methane (bisphenol F) or 2,2-bis(4-hydroxyphenyl)propane (bisphenol A), or on condensation products of phenols or cresols with formaldehyde which are obtained under acid conditions, such as phenol novolaks and cresol novolaks.

III) Poly(N-glycidyl) compounds are, for example, obtainable by dehydrochlorination of the reaction products of epichlorohydrin with amines which comprise at least two amine hydrogen atoms. These amines are, for example, n-butylamine, aniline, toluidine, m-xylylenediamine, bis(4-aminophenyl)methane or bis(4-methylaminophenyl)methane.

However, the poly(N-glycidyl) compounds also include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin.

IV) Examples of poly(S-glycidyl) compounds are di-S-glycidyl derivatives, which are derived from dithiols, for example ethane-1,2-dithiol or bis(4-mercaptomethylphenyl) ether.

V) Examples of epoxy resins comprising a radical of the formula III, in which $R_5$ and $R_7$ together are —$CH_2$—$CH_2$— and n=0, are bis(2,3-epoxycyclopentyl) ether, 2,3-epoxycyclopentyl glycidyl ether or 1,2-bis(2,3-epoxycyclopentyloxy)ethane. An example of an epoxy resin comprising a radical of the formula III in which $R_5$ and $R_7$ together are —$CH_2$—$CH_2$— and n=1 is (3',4'-epoxy-6'-methylcyclohexyl)methyl 3,4-epoxy-6-methyl-cyclohexanecarboxylate.

However, it is also possible to use epoxy resins in which the 1,2-epoxy groups are bonded to different hetero atoms or functional groups. These compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

In addition, liquid prereacted adducts of such epoxy resins with curing agents for epoxy resins are also suitable.

If desired, a mixture of epoxy resins can be used in the compositions according to the invention.

Compositions comprising, as component A1, at least one epoxy resin based on a bisphenol are preferred.

Compositions comprising, as component A1, a mixture of a bisphenol A diglycidyl ether, a bisphenol F diglycidyl ether and butane-1,4-diol diglycidyl ether are particularly preferred.

Compositions comprising, as component A2, aluminium oxide trihydrate ($Al_2O_3.3H_2O$) having a particle size of less than 100 µm are also preferred. Aluminium oxide trihydrates of this type are generally known and some are available commercially, for example Apyral® 2E from VAW (average particle size $D_{50}$: 20–25 µm as determined by sieving).

Suitable further fillers A3 which can be used alongside aluminium oxide trihydrate in the compositions according to the invention are, for example, wollastonite (naturally occurring or commercially available calcium metasilicate), synthetic fibres, such as polyvinyl alcohol, polyamide and polyester fibres, glass fibres, boron fibres, carbon fibres, glass powder, ground quartz, synthetic ground quartz (crystalline-amorphous ground quartz), mica, slate powder, kaolin, dirt-burned kaolin, dolomite, diopside, talc, calcium carbonate, ground chalk, gypsum, bentones, silica aerogel (Aerosils), barium sulfate, lithopones, barytes, titanium dioxide or carbon black. In this context, those skilled in the art know that electrically conducting fillers should be avoided for insulation applications in electrical engineering.

Compositions comprising pure ground quartz as component A3 are preferred.

Conventional additives according to A4 can also be added to the compositions according to the invention, for example dyes, pigments, plasticisers, antifoams, anti-settling agents, flow agents, for example silicones, waxes and stearates, some of which are also used as mould release agents, thixotropic agents, antioxidants, light stabilisers and adhesion promoters, for example silanes.

Compositions comprising an adhesion promoter as component A4 are preferred.

Compositions comprising γ-glycidoxypropyltrimethoxysilane as adhesion promoter are particularly preferred.

The carboxylic acid anhydrides which can be used to cure the epoxy resin compositions are derived from organic polycarboxylic acids, in particular dicarboxylic acids. The polycarboxylic acids used can be, quite generally, aliphatic, cycloaliphatic, aromatic or araliphatic compounds having at least two carboxyl groups, in particular two carboxyl groups.

Examples of polycarboxylic acids are saturated aliphatic dicarboxylic acids, such as oxalic acid, malonic acid, succinic acid, α-methylsuccinic acid, glutaric acid, adipic acid, pimelic acid, azelaic acid, sebacic acid or dimerised linoleic acid; or unsaturated aliphatic dicarboxylic acids, such as maleic acid, mesaconic acid (methylfumaric acid), citraconic acid (methylmaleic acid) or itaconic acid (methylenesuccinic acid); or cycloaliphatic dicarboxylic acids, such as hexahydrophthalic acid, hexahydroisophthalic acid or hexahydroterephthalic acid, or tetrahydrophthalic acid, tetrahydroisophthalic acid or tetrahydroterephthalic acid, or 4-methyltetrahydrophthalic acid, 4-methylhexahydrophthalic acid or nadic acid (bicyclo[2.2.1]hept-5-ene-2,3-dicarboxylic acid), or aromatic dicarboxylic acids, such as phthalic acid, isophthalic acid or terephthalic acid.

Examples of tricarboxylic acids and higher carboxylic acids are, in particular, aromatic tricarboxylic or tetracarboxylic acids, such as trimellitic acid, trimesic acid, pyromellitic acid or benzophenonetetracarboxylic acid, as well as dimerised or trimerised fatty acids.

Compositions comprising a cycloaliphatic carboxylic acid anhydride as component B are preferred.

Compositions comprising, as component B, a cycloaliphatic diamine selected from the group consisting of 1,2-diaminocyclohexane, 1,4-diaminocyclohexane, bis(4-aminocyclohexyl)methane and bis(4-amino-3-methylcyclohexyl)methane are also preferred.

Compositions comprising, as component B, bis(4-aminocyclohexyl)methane or bis(4-amino-3-methylcyclohexyl)methane are particularly preferred.

In the compositions according to the invention, component A is present in the customarily effective proportions relative to component B. For example, the proportion can be so chosen that there are 0.5 to 1.2 equivalents of anhydride groups per one equivalent of epoxy group. The proportion of component A to component B depends, for example, on the required curing rate and the properties desired in the end product and can easily be determined by a person skilled in the art.

If desired, a curing accelerator can be added to the compositions according to the invention. A further embodiment of the present invention therefore comprises compositions according to the definition give above which additionally comprise C) at least one curing accelerator.

Suitable curing accelerators are per se arbitrary compounds which are capable of accelerating the curing reaction. Examples are: complexes of amines, especially tertiary amines, monoethylamine, trimethylamine and octadimethylamine, with boron trifluoride or boron trichloride, and also tertiary amines, such as benzyldimethylamine, tris(dimethylaminomethyl)phenol, hexamethylenetetramine or 1,6-bis-(dimethylamino)hexane; urea derivatives, such as N-4-chlorophenyl-N',N'-dimethylurea (monuron), N-3-chloro-4-methylphenyl-N',N'-dimethylurea (chlorotoluron), N-(2-hydroxyphenyl)-N',N'-dimethylurea and N-(2-hydroxy-4-nitrophenyl)-N',N'-dimethylurea, and substituted or unsubstituted imidazoles, such as imidazole, benzimidazole, 1-methylimidazole, 3-methylimidazole, 2-ethyl-4-methylimidazole, 2-vinylimidazole, 2-phenylimidazole, 2-phenyl-4-methylimidazole, 1-(2,6-dichlorobenzoyl)-2-phenylimidazole and 1-(2,4,6-trimethylbenzoyl)-2-phenylimidazole.

Tertiary amines, especially benzyldimethylamine, and imidazoles, especially 2-phenylimidazole, 1-methylimidazole, 3-methylimidazole and 2-ethyl-4-methylimidazole, are preferred curing accelerators.

Compositions which have a component C content of between 0.05 and 5% by weight, with respect to the total weight of the composition, are preferred.

The preparation of the compositions according to the invention can be carded out in the conventional manner by mixing the components with the aid of known mixing equipment, for example with the aid of stirrers, kneaders, rolls or mills.

Curing of the compositions according to the invention can be carried out in one or more stages in a manner known per se. Curing is generally carried out by heating to temperatures between 80° and 200° C., in particular between 90° and 160° C.

The present invention therefore also provides a process for the preparation of cured products using the compositions according to the invention.

It was not foreseeable that it is possible to dispense with the use of toxicologically unacceptable components while at the same time retaining very good application properties. As a result it is possible to reduce the level of pollution for man and the environment when preparing, using and disposing of materials. Furthermore, the high thermal conductivity resulting from the high degree of filling permits more rapid curing of the epoxy resin system according to the invention, since the liberated heat of reaction is more effectively removed, which leads to savings in time and to a reduction in costs for the processor. Furthermore, the highly filled epoxy casting resin compositions also have the property of impregnating, for example, the windings of the secondary coil of a flyback transformer. A lower degree of filling has been chosen hitherto for this reason, the abovementioned additives of questionable acceptability being added in order to achieve the desired flame retardancy.

The invention also relates to the use of the compositions according to the invention as encapsulating material for electrical and electronic components, in particular for flyback transformers.

The following examples illustrate the invention in more detail.

EXAMPLE 1

14.0 g of bisphenol F diglycidyl ether, 6.0 g of bisphenol A diglycidyl ether and 1.5 g of butanediol diglycidyl ether are mixed with 65.2 g of aluminium oxide trihydrate (Apyral 2 E from VAW), 13.0 g of pure ground quartz and 0.3 g of γ-glycidyloxypropyltrimethoxysilane. 18.8 g of methyltetrahydrophthalic anhydride and 0.3 g of benzyldimethylamine are then added.

The casting resin mixture is then cast into moulds at 70° C. The mixture is cured for one hour at 90° C. and one hour at 110° C.

The following properties were determined for the casting resin mixture and the mouldings:

| | |
|---|---|
| Viscosity (Brookfield, 50° C.): | 2400 Pa · s |
| Gel times | |
| at 90° C.: | 36 min |
| at 100° C.: | 19 min |
| Glass transition temperature $T_g$ (Mettler DSC): | 116° C. |
| Water absorption according to PCT after 1, 4 and 7 days: | 1.24%/2.24%/2.67% |
| Flexural strength (ISO 178,25° C.): | 86.9 N/mm$^2$ |
| Outer fibre strain (ISO 178): | 0.87% |
| Tensile strength (ISO R 527,23° C.): | 58.3 N/mm$^2$ |
| Elongation (ISO R 527): | 0.73% |
| Modulus of elasticity [tension] (ISO R 527): | 11.01 kN/mm$^2$ |
| Thermal conductivity (VDA, 25° C.): | 1.13 W · m$^{-1}$ · K$^{-1}$ |
| tan δ (IEC 250) | |
| at 25° C. and 50 Hz/1 kHz/10 kHz: | 1.3/0.9/0.8 |

| | |
|---|---|
| at 70° C. and 50 Hz/1 kHz/10 kHz: | 3.3/1.8/1.1 |
| $\varepsilon_r$ | |
| at 25° C. and 50 Hz/1 kHz/10 kHz: | 4.4/4.3/4.3 |
| at 70° C. and 50 Hz/1 kHz/10 kHz | 4.7/4.5/4.4 |
| tan δ after storing moist for 100 h at 85° C. and 85% relative atmospheric humidity (IEC 250) | |
| at 25° C. and 50 Hz/1 kHz/10 kHz: | 5.9/3.1/2.1 |
| at 70° C. and 50 Hz/1 kHz/10 kHz: | 16.5/6.9/3.8 |
| $\varepsilon_r$ after storing moist for 100 h at 85° C. and 85% relative atmospheric humidity (IEC 250) | |
| at 25° C. and 50 Hz/1 kHz/10 kHz: | 5.2/4.8/4.6 |
| at 70° C. and 50 Hz/1 kHz/10 kHz: | 6.3/5.2/4.8 |
| Dielectric strength (IEC 243; 3 mm, 20 s value at 22° C.): | 16.9 kV/mm |
| Specific volume resistance (DIN 53482) at 25° C./75° C./125° C.: | E15/E15/E15 |
| Flame retardancy (UL 94 (1,6 mm)): | V-0 |

EXAMPLE 2

16.3 g of bisphenol F diglycidyl ether, 7.0 g of bisphenol A diglycidyl ether and 5.8 g of butanediol diglycidyl ether are mixed with 70.4 g of aluminium oxide trihydrate (Apyral 2 E from VAW), 0.3 g of γ-glycidyloxypropyltrimethoxysilane and 0.2 g of an organically modified phyllosilicate (bentone SD-2 from NL Chemicals). 11.0 g of bis(4-amino-3-methylcyclohexyl)methane are then added.

The casting resin mixture is then cast into moulds at 70° C. The mixture is cured for one hour at 70° C. and one hour at 110° C.

The following properties are determined for the casting resin mixture and the mouldings:

| Gel times | |
|---|---|
| at 60° C.: | 70 min |
| at 70° C.: | 40 min |
| Glass transition temperature $T_g$ (Mettler DSC): | 110° C. |
| Flame retardancy (UL 94 (1.6 mm)): | V-0 |

What is claimed is:

1. A flame-retarded casting resin composition for electrical and electronic components consisting essentially of:
   A) an epoxy resin mixture consisting essentially of
   A1) 15–35% by weight of a liquid mixture of a bisphenol A diglycidyl ether, a bisphenol F diglycidyl ether and butane-1,4-diol diglycidyl ether,
   A2) 55–85% by weight of aluminum oxide trihydrate having a particle size of $D_{50}$ 20–25 μm as determined by sieving,
   A3) 0–20% by weight of at least one further non-electrically conducting filler and
   A4) 0–5% by weight of at least one further additive, selected from the group consisting of dyes, pigments, plasticizers, antifoams, flow agents, mould release agents, thixotropic agents, antioxidants, light stabilizers and adhesion promoters
   B) at least one carboxylic acid anhydride or
   a cycloaliphatic diamine of the formula I or II

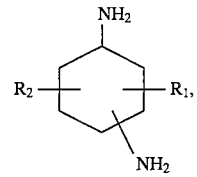
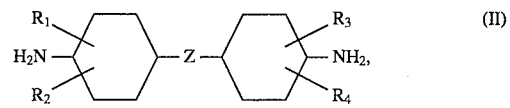

in which the radicals $R_1$ to $R_4$ independently of one another are hydrogen or $C_1$–$C_4$ alkyl and Z is a direct bond, —$CH_2$—, —$C(CH_3)_2$—, —S—, —O—, —$SO_2$— or —CO—, in an amount sufficient to cure component A, the content of components A2 and A3 together being 63–80% by weight, with respect to the total weight of components A and B and
   C) optionally at least one cure accelerator.

2. A casting resin composition according to claim 1, wherein component A is an epoxy resin mixture consisting of
   A1) 18–30% by weight of a mixture of a bisphenol A diglycidyl ether, a bisphenol F diglycidyl ether and butane-1,4-diol diglycidyl ether,
   A2) 60–80% by weight of aluminium oxide trihydrate having an average particle size of 20 to 25 μm as determined by sieving,
   A3) 0–15% by weight of at least one further non-electrically conducting filler and
   A4) 0–3% by weight of at least one further additive selected from the group consisting of dyes, pigments, plasticizers, antifoams, flow agents, mould release agents, thixotropic agents, antioxidants, light stabilizers and adhesion promoters.

3. A composition according to claim 1, comprising, as component B, a carboxylic acid anhydride in an amount sufficient to cure component A.

4. A composition according to claim 1, in which the content of components A2 and A3 together is 63–70% by weight, with respect to the total weight of the composition.

5. A composition according to claim 1, comprising 100% by weight ground quartz as component A3.

6. A composition according to claim 1, comprising an adhesion promoter as component A4.

7. A composition according to claim 6, comprising γ-glycidoxypropylmethoxysilane as adhesion promoter.

8. A composition according to claim 1, comprising a cycloaliphatic carboxylic acid anhydride as component B.

9. A composition according to claim 1, comprising, as component B, a cycloaliphatic diamine selected from the group consisting of 1,2-diaminocyclohexane, 1,4-diaminocyclohexane, bis(4-aminocyclohexyl)methane and bis(4-amino-3-methylcyclohexyl)methane.

10. A composition according to claim 9, comprising, as component B, bis(4-aminocyclohexyl)methane or bis(4-amino-3-methylcyclohexyl)methane.

11. A composition according to claim 1, in which the component C content is 0.05–5% by weight, with respect to the total weight of the composition.

* * * * *